(12) United States Patent
Fallone et al.

(10) Patent No.: US 9,268,649 B1
(45) Date of Patent: Feb. 23, 2016

(54) DISK DRIVE WITH RECENT WRITE STREAMS LIST FOR DATA REFRESH DETERMINATION

(75) Inventors: Robert Morelli Fallone, Newport Beach, CA (US); Edwin Scott Olds, Fort Collins, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 1124 days.

(21) Appl. No.: 13/167,246

(22) Filed: Jun. 23, 2011

(51) Int. Cl.
*G06F 11/14* (2006.01)
*G11B 15/68* (2006.01)
*G06F 12/08* (2006.01)
*G11B 17/22* (2006.01)

(52) U.S. Cl.
CPC ........ *G06F 11/1456* (2013.01); *G06F 12/0866* (2013.01); *G11B 15/68* (2013.01); *G11B 17/22* (2013.01)

(58) Field of Classification Search
None
See application file for complete search history.

(56) References Cited

U.S. PATENT DOCUMENTS

| | | | |
|---|---|---|---|
| 5,764,903 A * | 6/1998 | Yu | 709/208 |
| 6,018,789 A | 1/2000 | Sokolov et al. | |
| 6,065,095 A | 5/2000 | Sokolov et al. | |
| 6,078,452 A | 6/2000 | Kittilson et al. | |
| 6,081,447 A | 6/2000 | Lofgren et al. | |
| 6,092,149 A * | 7/2000 | Hicken et al. | 711/113 |
| 6,092,150 A | 7/2000 | Sokolov et al. | |
| 6,094,707 A | 7/2000 | Sokolov et al. | |
| 6,105,104 A | 8/2000 | Guttmann et al. | |
| 6,111,717 A | 8/2000 | Cloke et al. | |
| 6,145,052 A | 11/2000 | Howe et al. | |
| 6,175,893 B1 | 1/2001 | D'Souza et al. | |
| 6,178,056 B1 | 1/2001 | Cloke et al. | |
| 6,191,909 B1 | 2/2001 | Cloke et al. | |
| 6,195,218 B1 | 2/2001 | Guttmann et al. | |
| 6,205,494 B1 | 3/2001 | Williams | |
| 6,208,477 B1 | 3/2001 | Cloke et al. | |
| 6,223,303 B1 | 4/2001 | Billings et al. | |
| 6,230,233 B1 | 5/2001 | Lofgren et al. | |
| 6,246,346 B1 | 6/2001 | Cloke et al. | |
| 6,249,393 B1 | 6/2001 | Billings et al. | |
| 6,256,695 B1 | 7/2001 | Williams | |
| 6,262,857 B1 | 7/2001 | Hull et al. | |
| 6,263,459 B1 | 7/2001 | Schibilla | |
| 6,272,694 B1 | 8/2001 | Weaver et al. | |
| 6,278,568 B1 | 8/2001 | Cloke et al. | |
| 6,279,089 B1 | 8/2001 | Schibilla et al. | |
| 6,289,484 B1 | 9/2001 | Rothberg et al. | |
| 6,292,912 B1 | 9/2001 | Cloke et al. | |
| 6,310,740 B1 | 10/2001 | Dunbar et al. | |
| 6,317,850 B1 | 11/2001 | Rothberg | |
| 6,327,106 B1 | 12/2001 | Rothberg | |

(Continued)

*Primary Examiner* — Edward Dudek, Jr.
*Assistant Examiner* — Christopher Birkhimer (57) ABSTRACT

A disk drive is disclosed comprising a disk comprising a plurality of refresh regions, each refresh region comprising a range of logical block addresses (LBAs). The disk drive further comprises a recent write streams list comprising one or more entries, each entry representing an LBA stream. The disk drive further comprises a head actuated radially over the disk to write data to and read data from the disk, and control circuitry coupled to the head, wherein the control circuitry is operable to execute a write command comprising one or more LBAs, determine whether the one or more LBAs are sequential to an entry in the recent write streams list, modify an entry in the recent write streams list when the one or more LBAs are sequential to the entry, and utilize the modified entry to determine whether to reset a refresh counter associated with a refresh region.

20 Claims, 4 Drawing Sheets

(56) References Cited

U.S. PATENT DOCUMENTS

| | | | |
|---|---|---|---|
| 6,337,778 B1 | 1/2002 | Gagne |
| 6,369,969 B1 | 4/2002 | Christiansen et al. |
| 6,384,999 B1 | 5/2002 | Schibilla |
| 6,385,676 B1 * | 5/2002 | Adkisson | 710/100 |
| 6,388,833 B1 | 5/2002 | Golowka et al. |
| 6,405,342 B1 | 6/2002 | Lee |
| 6,408,357 B1 | 6/2002 | Hanmann et al. |
| 6,408,406 B1 | 6/2002 | Parris |
| 6,411,452 B1 | 6/2002 | Cloke |
| 6,411,458 B1 | 6/2002 | Billings et al. |
| 6,412,083 B1 | 6/2002 | Rothberg et al. |
| 6,415,349 B1 | 7/2002 | Hull et al. |
| 6,425,128 B1 | 7/2002 | Krapf et al. |
| 6,429,984 B1 | 8/2002 | Alex |
| 6,441,981 B1 | 8/2002 | Cloke et al. |
| 6,442,328 B1 | 8/2002 | Elliott et al. |
| 6,445,524 B1 | 9/2002 | Nazarian et al. |
| 6,449,767 B1 | 9/2002 | Krapf et al. |
| 6,453,115 B1 | 9/2002 | Boyle |
| 6,470,420 B1 | 10/2002 | Hospodor |
| 6,480,020 B1 | 11/2002 | Jung et al. |
| 6,480,349 B1 | 11/2002 | Kim et al. |
| 6,480,932 B1 | 11/2002 | Vallis et al. |
| 6,483,986 B1 | 11/2002 | Krapf |
| 6,487,032 B1 | 11/2002 | Cloke et al. |
| 6,490,635 B1 | 12/2002 | Holmes |
| 6,493,173 B1 | 12/2002 | Kim et al. |
| 6,499,083 B1 | 12/2002 | Hamlin |
| 6,519,104 B1 | 2/2003 | Cloke et al. |
| 6,525,892 B1 | 2/2003 | Dunbar et al. |
| 6,530,000 B1 * | 3/2003 | Krantz et al. | 711/151 |
| 6,545,830 B1 | 4/2003 | Briggs et al. |
| 6,546,489 B1 | 4/2003 | Frank, Jr. et al. |
| 6,550,021 B1 | 4/2003 | Dalphy et al. |
| 6,552,880 B1 | 4/2003 | Dunbar et al. |
| 6,553,457 B1 | 4/2003 | Wilkins et al. |
| 6,567,094 B1 * | 5/2003 | Curry et al. | 345/558 |
| 6,578,106 B1 | 6/2003 | Price |
| 6,580,573 B1 | 6/2003 | Hull et al. |
| 6,594,183 B1 | 7/2003 | Lofgren et al. |
| 6,600,620 B1 | 7/2003 | Krounbi et al. |
| 6,601,137 B1 | 7/2003 | Castro et al. |
| 6,603,622 B1 | 8/2003 | Christiansen et al. |
| 6,603,625 B1 | 8/2003 | Hospodor et al. |
| 6,604,220 B1 | 8/2003 | Lee |
| 6,606,682 B1 | 8/2003 | Dang et al. |
| 6,606,714 B1 | 8/2003 | Thelin |
| 6,606,717 B1 | 8/2003 | Yu et al. |
| 6,611,393 B1 | 8/2003 | Nguyen et al. |
| 6,615,312 B1 | 9/2003 | Hamlin et al. |
| 6,628,466 B2 | 9/2003 | Alex |
| 6,639,748 B1 | 10/2003 | Christiansen et al. |
| 6,647,481 B1 | 11/2003 | Luu et al. |
| 6,651,113 B1 * | 11/2003 | Grimsrud | 710/22 |
| 6,654,193 B1 | 11/2003 | Thelin |
| 6,657,810 B1 | 12/2003 | Kupferman |
| 6,661,591 B1 | 12/2003 | Rothberg |
| 6,665,772 B1 | 12/2003 | Hamlin |
| 6,687,073 B1 | 2/2004 | Kupferman |
| 6,687,078 B1 | 2/2004 | Kim |
| 6,687,850 B1 | 2/2004 | Rothberg |
| 6,690,523 B1 | 2/2004 | Nguyen et al. |
| 6,690,882 B1 | 2/2004 | Hanmann et al. |
| 6,691,198 B1 | 2/2004 | Hamlin |
| 6,691,213 B1 | 2/2004 | Luu et al. |
| 6,691,255 B1 | 2/2004 | Rothberg et al. |
| 6,693,760 B1 | 2/2004 | Krounbi et al. |
| 6,694,477 B1 | 2/2004 | Lee |
| 6,697,914 B1 | 2/2004 | Hospodor et al. |
| 6,704,153 B1 | 3/2004 | Rothberg et al. |
| 6,708,251 B1 | 3/2004 | Boyle et al. |
| 6,710,951 B1 | 3/2004 | Cloke |
| 6,711,628 B1 | 3/2004 | Thelin |
| 6,711,635 B1 | 3/2004 | Wang |
| 6,711,660 B1 | 3/2004 | Milne et al. |
| 6,715,044 B2 | 3/2004 | Lofgren et al. |
| 6,724,982 B1 | 4/2004 | Hamlin |
| 6,725,329 B1 | 4/2004 | Ng et al. |
| 6,735,650 B1 | 5/2004 | Rothberg |
| 6,735,693 B1 | 5/2004 | Hamlin |
| 6,744,772 B1 | 6/2004 | Eneboe et al. |
| 6,745,283 B1 | 6/2004 | Dang |
| 6,751,402 B1 | 6/2004 | Elliott et al. |
| 6,757,481 B1 | 6/2004 | Nazarian et al. |
| 6,772,281 B2 | 8/2004 | Hamlin |
| 6,781,826 B1 | 8/2004 | Goldstone et al. |
| 6,782,449 B1 | 8/2004 | Codilian et al. |
| 6,791,779 B1 | 9/2004 | Singh et al. |
| 6,792,486 B1 | 9/2004 | Hanan et al. |
| 6,799,274 B1 | 9/2004 | Hamlin |
| 6,811,427 B2 | 11/2004 | Garrett et al. |
| 6,826,003 B1 | 11/2004 | Subrahmanyam |
| 6,826,614 B1 | 11/2004 | Hanmann et al. |
| 6,832,041 B1 | 12/2004 | Boyle |
| 6,832,929 B2 | 12/2004 | Garrett et al. |
| 6,845,405 B1 | 1/2005 | Thelin |
| 6,845,427 B1 | 1/2005 | Atai-Azimi |
| 6,850,443 B2 | 2/2005 | Lofgren et al. |
| 6,851,055 B1 | 2/2005 | Boyle et al. |
| 6,851,063 B1 | 2/2005 | Boyle et al. |
| 6,853,731 B1 | 2/2005 | Boyle et al. |
| 6,854,022 B1 | 2/2005 | Thelin |
| 6,862,660 B1 | 3/2005 | Wilkins et al. |
| 6,880,043 B1 | 4/2005 | Castro et al. |
| 6,882,486 B1 | 4/2005 | Kupferman |
| 6,884,085 B1 | 4/2005 | Goldstone |
| 6,888,831 B1 | 5/2005 | Hospodor et al. |
| 6,892,217 B1 | 5/2005 | Hanmann et al. |
| 6,892,249 B1 | 5/2005 | Codilian et al. |
| 6,892,313 B1 | 5/2005 | Codilian et al. |
| 6,895,455 B1 | 5/2005 | Rothberg |
| 6,895,500 B1 | 5/2005 | Rothberg |
| 6,898,730 B1 | 5/2005 | Hanan |
| 6,910,099 B1 | 6/2005 | Wang et al. |
| 6,928,470 B1 | 8/2005 | Hamlin |
| 6,931,439 B1 | 8/2005 | Hanmann et al. |
| 6,934,104 B1 | 8/2005 | Kupferman |
| 6,934,713 B2 | 8/2005 | Schwartz et al. |
| 6,940,873 B2 | 9/2005 | Boyle et al. |
| 6,943,978 B1 | 9/2005 | Lee |
| 6,948,165 B1 | 9/2005 | Luu et al. |
| 6,950,267 B1 | 9/2005 | Liu et al. |
| 6,954,733 B1 | 10/2005 | Ellis et al. |
| 6,961,814 B1 | 11/2005 | Thelin et al. |
| 6,965,489 B1 | 11/2005 | Lee et al. |
| 6,965,563 B1 | 11/2005 | Hospodor et al. |
| 6,965,966 B1 | 11/2005 | Rothberg et al. |
| 6,967,799 B1 | 11/2005 | Lee |
| 6,968,422 B1 | 11/2005 | Codilian et al. |
| 6,968,450 B1 | 11/2005 | Rothberg et al. |
| 6,973,495 B1 | 12/2005 | Milne et al. |
| 6,973,570 B1 | 12/2005 | Hamlin |
| 6,976,190 B1 | 12/2005 | Goldstone |
| 6,983,316 B1 | 1/2006 | Milne et al. |
| 6,986,007 B1 | 1/2006 | Procyk et al. |
| 6,986,154 B1 | 1/2006 | Price et al. |
| 6,995,933 B1 | 2/2006 | Codilian et al. |
| 6,996,501 B1 | 2/2006 | Rothberg |
| 6,996,669 B1 | 2/2006 | Dang et al. |
| 7,002,926 B1 | 2/2006 | Eneboe et al. |
| 7,003,674 B1 | 2/2006 | Hamlin |
| 7,006,316 B1 | 2/2006 | Sargenti, Jr. et al. |
| 7,009,820 B1 | 3/2006 | Hogg |
| 7,023,639 B1 | 4/2006 | Kupferman |
| 7,024,491 B1 | 4/2006 | Hanmann et al. |
| 7,024,549 B1 | 4/2006 | Luu et al. |
| 7,024,614 B1 | 4/2006 | Thelin et al. |
| 7,027,716 B1 | 4/2006 | Boyle et al. |
| 7,028,174 B1 | 4/2006 | Atai-Azimi et al. |
| 7,031,902 B1 | 4/2006 | Catiller |
| 7,046,465 B1 | 5/2006 | Kupferman |
| 7,046,488 B1 | 5/2006 | Hogg |
| 7,050,252 B1 | 5/2006 | Vallis |
| 7,054,937 B1 | 5/2006 | Milne et al. |

(56) References Cited

U.S. PATENT DOCUMENTS

| | | |
|---|---|---|
| 7,055,000 B1 | 5/2006 | Severtson |
| 7,055,167 B1 | 5/2006 | Masters |
| 7,057,836 B1 | 6/2006 | Kupferman |
| 7,062,398 B1 | 6/2006 | Rothberg |
| 7,075,746 B1 | 7/2006 | Kupferman |
| 7,076,604 B1 | 7/2006 | Thelin |
| 7,082,494 B1 | 7/2006 | Thelin et al. |
| 7,088,538 B1 | 8/2006 | Codilian et al. |
| 7,088,545 B1 | 8/2006 | Singh et al. |
| 7,092,186 B1 | 8/2006 | Hogg |
| 7,095,577 B1 | 8/2006 | Codilian et al. |
| 7,099,095 B1 | 8/2006 | Subrahmanyam et al. |
| 7,106,537 B1 | 9/2006 | Bennett |
| 7,106,947 B2 | 9/2006 | Boyle et al. |
| 7,110,202 B1 | 9/2006 | Vasquez |
| 7,111,116 B1 | 9/2006 | Boyle et al. |
| 7,114,029 B1 | 9/2006 | Thelin |
| 7,120,737 B1 | 10/2006 | Thelin |
| 7,120,806 B1 | 10/2006 | Codilian et al. |
| 7,126,776 B1 | 10/2006 | Warren, Jr. et al. |
| 7,129,763 B1 | 10/2006 | Bennett et al. |
| 7,133,600 B1 | 11/2006 | Boyle |
| 7,136,244 B1 | 11/2006 | Rothberg |
| 7,146,094 B1 | 12/2006 | Boyle |
| 7,149,046 B1 | 12/2006 | Coker et al. |
| 7,150,036 B1 | 12/2006 | Milne et al. |
| 7,155,616 B1 | 12/2006 | Hamlin |
| 7,171,108 B1 | 1/2007 | Masters et al. |
| 7,171,110 B1 | 1/2007 | Wilshire |
| 7,194,576 B1 | 3/2007 | Boyle |
| 7,196,860 B2 | 3/2007 | Alex |
| 7,200,698 B1 | 4/2007 | Rothberg |
| 7,205,805 B1 | 4/2007 | Bennett |
| 7,206,497 B1 | 4/2007 | Boyle et al. |
| 7,215,496 B1 | 5/2007 | Kupferman et al. |
| 7,215,771 B1 | 5/2007 | Hamlin |
| 7,237,054 B1 | 6/2007 | Cain et al. |
| 7,240,161 B1 | 7/2007 | Boyle |
| 7,246,210 B2 * | 7/2007 | Georgis et al. ............... 711/161 |
| 7,249,365 B1 | 7/2007 | Price et al. |
| 7,263,709 B1 | 8/2007 | Krapf |
| 7,274,639 B1 | 9/2007 | Codilian et al. |
| 7,274,659 B2 | 9/2007 | Hospodor |
| 7,275,116 B1 | 9/2007 | Hanmann et al. |
| 7,280,302 B1 | 10/2007 | Masiewicz |
| 7,292,774 B1 | 11/2007 | Masters et al. |
| 7,292,775 B1 | 11/2007 | Boyle et al. |
| 7,296,284 B1 | 11/2007 | Price et al. |
| 7,302,501 B1 | 11/2007 | Cain et al. |
| 7,302,579 B1 | 11/2007 | Cain et al. |
| 7,318,088 B1 | 1/2008 | Mann |
| 7,319,806 B1 | 1/2008 | Willner et al. |
| 7,325,244 B2 | 1/2008 | Boyle et al. |
| 7,330,323 B1 | 2/2008 | Singh et al. |
| 7,346,790 B1 | 3/2008 | Klein |
| 7,366,641 B1 | 4/2008 | Masiewicz et al. |
| 7,369,340 B1 | 5/2008 | Dang et al. |
| 7,369,343 B1 | 5/2008 | Yeo et al. |
| 7,372,650 B1 | 5/2008 | Kupferman |
| 7,380,147 B1 | 5/2008 | Sun |
| 7,383,375 B2 * | 6/2008 | Sinclair ............... 711/103 |
| 7,392,340 B1 | 6/2008 | Dang et al. |
| 7,404,013 B1 | 7/2008 | Masiewicz |
| 7,406,545 B1 | 7/2008 | Rothberg et al. |
| 7,415,571 B1 | 8/2008 | Hanan |
| 7,433,993 B2 * | 10/2008 | Sinclair ............... 711/103 |
| 7,436,610 B1 | 10/2008 | Thelin |
| 7,437,502 B1 * | 10/2008 | Coker ............... 711/112 |
| 7,440,214 B1 | 10/2008 | Ell et al. |
| 7,451,344 B1 | 11/2008 | Rothberg |
| 7,471,483 B1 | 12/2008 | Ferris et al. |
| 7,471,486 B1 | 12/2008 | Coker et al. |
| 7,484,058 B2 * | 1/2009 | Frey et al. ............... 711/162 |
| 7,486,060 B1 | 2/2009 | Bennett |
| 7,496,493 B1 | 2/2009 | Stevens |
| 7,518,819 B1 | 4/2009 | Yu et al. |
| 7,526,184 B1 | 4/2009 | Parkinen et al. |
| 7,539,924 B1 | 5/2009 | Vasquez et al. |
| 7,543,117 B1 | 6/2009 | Hanan |
| 7,551,383 B1 | 6/2009 | Kupferman |
| 7,562,282 B1 | 7/2009 | Rothberg |
| 7,577,973 B1 | 8/2009 | Kapner, III et al. |
| 7,596,797 B1 | 9/2009 | Kapner, III et al. |
| 7,599,139 B1 | 10/2009 | Bombet et al. |
| 7,617,365 B2 * | 11/2009 | Zhang et al. ............... 711/141 |
| 7,619,841 B1 | 11/2009 | Kupferman |
| 7,647,544 B1 | 1/2010 | Masiewicz |
| 7,649,704 B1 | 1/2010 | Bombet et al. |
| 7,653,927 B1 | 1/2010 | Kapner, III et al. |
| 7,656,603 B1 | 2/2010 | Xing |
| 7,656,763 B1 | 2/2010 | Jin et al. |
| 7,657,149 B2 | 2/2010 | Boyle |
| 7,672,072 B1 | 3/2010 | Boyle et al. |
| 7,673,075 B1 | 3/2010 | Masiewicz |
| 7,688,540 B1 | 3/2010 | Mei et al. |
| 7,707,367 B1 * | 4/2010 | Tran et al. ............... 711/154 |
| 7,724,461 B1 | 5/2010 | McFadyen et al. |
| 7,725,584 B1 | 5/2010 | Hanmann et al. |
| 7,730,295 B1 | 6/2010 | Lee |
| 7,760,458 B1 | 7/2010 | Trinh |
| 7,768,776 B1 | 8/2010 | Szeremeta et al. |
| 7,804,657 B1 | 9/2010 | Hogg et al. |
| 7,813,954 B1 | 10/2010 | Price et al. |
| 7,827,320 B1 | 11/2010 | Stevens |
| 7,839,588 B1 | 11/2010 | Dang et al. |
| 7,843,660 B1 | 11/2010 | Yeo |
| 7,852,596 B2 | 12/2010 | Boyle et al. |
| 7,859,782 B1 | 12/2010 | Lee |
| 7,872,822 B1 | 1/2011 | Rothberg |
| 7,898,756 B1 | 3/2011 | Wang |
| 7,898,762 B1 | 3/2011 | Guo et al. |
| 7,900,037 B1 | 3/2011 | Fallone et al. |
| 7,907,364 B2 | 3/2011 | Boyle et al. |
| 7,929,234 B1 | 4/2011 | Boyle et al. |
| 7,933,087 B1 | 4/2011 | Tsai et al. |
| 7,933,090 B1 | 4/2011 | Jung et al. |
| 7,934,030 B1 | 4/2011 | Sargenti, Jr. et al. |
| 7,940,491 B2 | 5/2011 | Szeremeta et al. |
| 7,944,639 B1 | 5/2011 | Wang |
| 7,945,727 B2 | 5/2011 | Rothberg et al. |
| 7,949,564 B1 | 5/2011 | Hughes et al. |
| 7,949,838 B1 * | 5/2011 | Wong et al. ............... 711/154 |
| 7,974,029 B2 | 7/2011 | Tsai et al. |
| 7,974,039 B1 | 7/2011 | Xu et al. |
| 7,982,993 B1 | 7/2011 | Tsai et al. |
| 7,984,200 B1 | 7/2011 | Bombet et al. |
| 7,990,648 B1 | 8/2011 | Wang |
| 7,992,179 B1 | 8/2011 | Kapner, III et al. |
| 8,004,785 B1 | 8/2011 | Tsai et al. |
| 8,006,027 B1 | 8/2011 | Stevens et al. |
| 8,014,094 B1 | 9/2011 | Jin |
| 8,014,977 B1 | 9/2011 | Masiewicz et al. |
| 8,019,914 B1 | 9/2011 | Vasquez et al. |
| 8,040,625 B1 | 10/2011 | Boyle et al. |
| 8,078,943 B1 | 12/2011 | Lee |
| 8,079,045 B2 | 12/2011 | Krapf et al. |
| 8,082,433 B1 | 12/2011 | Fallone et al. |
| 8,085,487 B1 | 12/2011 | Jung et al. |
| 8,089,719 B1 | 1/2012 | Dakroub |
| 8,090,902 B1 | 1/2012 | Bennett et al. |
| 8,090,906 B1 | 1/2012 | Blaha et al. |
| 8,091,112 B1 | 1/2012 | Elliott et al. |
| 8,094,396 B1 | 1/2012 | Zhang et al. |
| 8,094,401 B1 | 1/2012 | Peng et al. |
| 8,116,020 B1 | 2/2012 | Lee |
| 8,116,025 B1 | 2/2012 | Chan et al. |
| 8,134,793 B1 | 3/2012 | Vasquez et al. |
| 8,134,798 B1 | 3/2012 | Thelin et al. |
| 8,139,301 B1 | 3/2012 | Li et al. |
| 8,139,310 B1 | 3/2012 | Hogg |
| 8,144,419 B1 | 3/2012 | Liu |
| 8,145,452 B1 | 3/2012 | Masiewicz et al. |
| 8,149,528 B1 | 4/2012 | Suratman et al. |
| 8,154,812 B1 | 4/2012 | Boyle et al. |

(56) References Cited

U.S. PATENT DOCUMENTS

| | | |
|---|---|---|
| 8,159,768 B1 | 4/2012 | Miyamura |
| 8,161,328 B1 | 4/2012 | Wilshire |
| 8,164,849 B1 | 4/2012 | Szeremeta et al. |
| 8,174,780 B1 | 5/2012 | Tsai et al. |
| 8,190,575 B1 | 5/2012 | Ong et al. |
| 8,194,338 B1 | 6/2012 | Zhang |
| 8,194,340 B1 | 6/2012 | Boyle et al. |
| 8,194,341 B1 | 6/2012 | Boyle |
| 8,201,066 B1 | 6/2012 | Wang |
| 8,271,692 B1 | 9/2012 | Dinh et al. |
| 8,279,550 B1 | 10/2012 | Hogg |
| 8,281,218 B1 | 10/2012 | Ybarra et al. |
| 8,285,923 B2 | 10/2012 | Stevens |
| 8,289,656 B1 | 10/2012 | Huber |
| 8,305,705 B1 | 11/2012 | Roohr |
| 8,307,156 B1 | 11/2012 | Codilian et al. |
| 8,310,775 B1 | 11/2012 | Boguslawski et al. |
| 8,315,006 B1 | 11/2012 | Chahwan et al. |
| 8,316,263 B1 | 11/2012 | Gough et al. |
| 8,320,067 B1 | 11/2012 | Tsai et al. |
| 8,324,974 B1 | 12/2012 | Bennett |
| 8,332,695 B2 | 12/2012 | Dalphy et al. |
| 8,341,337 B1 | 12/2012 | Ong et al. |
| 8,350,628 B1 | 1/2013 | Bennett |
| 8,356,184 B1 | 1/2013 | Meyer et al. |
| 8,370,683 B1 | 2/2013 | Ryan et al. |
| 8,375,225 B1 | 2/2013 | Ybarra |
| 8,375,274 B1 | 2/2013 | Bonke |
| 8,380,922 B1 | 2/2013 | DeForest et al. |
| 8,390,948 B2 | 3/2013 | Hogg |
| 8,390,952 B1 | 3/2013 | Szeremeta |
| 8,392,689 B1 | 3/2013 | Lott |
| 8,407,393 B1 | 3/2013 | Yolar et al. |
| 8,413,010 B1 | 4/2013 | Vasquez et al. |
| 8,417,566 B2 | 4/2013 | Price et al. |
| 8,421,663 B1 | 4/2013 | Bennett |
| 8,422,172 B1 | 4/2013 | Dakroub et al. |
| 8,427,771 B1 | 4/2013 | Tsai |
| 8,429,343 B1 | 4/2013 | Tsai |
| 8,433,937 B1 | 4/2013 | Wheelock et al. |
| 8,433,977 B1 | 4/2013 | Vasquez et al. |
| 8,458,526 B2 | 6/2013 | Dalphy et al. |
| 8,462,466 B2 | 6/2013 | Huber |
| 8,467,151 B1 | 6/2013 | Huber |
| 8,489,841 B1 | 7/2013 | Strecke et al. |
| 8,493,679 B1 | 7/2013 | Boguslawski et al. |
| 8,498,074 B1 | 7/2013 | Mobley et al. |
| 8,499,198 B1 | 7/2013 | Messenger et al. |
| 8,512,049 B1 | 8/2013 | Huber et al. |
| 8,514,506 B1 | 8/2013 | Li et al. |
| 8,531,791 B1 | 9/2013 | Reid et al. |
| 8,554,741 B1 | 10/2013 | Malina |
| 8,560,759 B1 | 10/2013 | Boyle et al. |
| 8,565,053 B1 | 10/2013 | Chung |
| 8,576,511 B1 | 11/2013 | Coker et al. |
| 8,578,100 B1 | 11/2013 | Huynh et al. |
| 8,578,242 B1 | 11/2013 | Burton et al. |
| 8,589,773 B1 | 11/2013 | Wang et al. |
| 8,593,753 B1 | 11/2013 | Anderson |
| 8,595,432 B1 | 11/2013 | Vinson et al. |
| 8,599,510 B1 | 12/2013 | Fallone |
| 8,601,248 B2 | 12/2013 | Thorsted |
| 8,611,032 B2 | 12/2013 | Champion et al. |
| 8,612,650 B1 | 12/2013 | Carrie et al. |
| 8,612,706 B1 | 12/2013 | Madril et al. |
| 8,612,798 B1 | 12/2013 | Tsai |
| 8,619,383 B1 | 12/2013 | Jung et al. |
| 8,621,115 B1 | 12/2013 | Bombet et al. |
| 8,621,133 B1 | 12/2013 | Boyle |
| 8,626,463 B2 | 1/2014 | Stevens et al. |
| 8,630,052 B1 | 1/2014 | Jung et al. |
| 8,630,056 B1 | 1/2014 | Ong |
| 8,631,188 B1 | 1/2014 | Heath et al. |
| 8,634,158 B1 | 1/2014 | Chahwan et al. |
| 8,635,412 B1 | 1/2014 | Wilshire |
| 8,640,007 B1 | 1/2014 | Schulze |
| 8,654,619 B1 | 2/2014 | Cheng |
| 8,661,193 B1 | 2/2014 | Cobos et al. |
| 8,667,248 B1 | 3/2014 | Neppalli |
| 8,670,205 B1 | 3/2014 | Malina et al. |
| 8,683,295 B1 | 3/2014 | Syu et al. |
| 8,683,457 B1 | 3/2014 | Hughes et al. |
| 8,687,306 B1 | 4/2014 | Coker et al. |
| 8,693,133 B1 | 4/2014 | Lee et al. |
| 8,694,841 B1 | 4/2014 | Chung et al. |
| 8,699,159 B1 | 4/2014 | Malina |
| 8,699,171 B1 | 4/2014 | Boyle |
| 8,699,172 B1 | 4/2014 | Gunderson et al. |
| 8,699,175 B1 | 4/2014 | Olds et al. |
| 8,699,185 B1 | 4/2014 | Teh et al. |
| 8,700,850 B1 | 4/2014 | Lalouette |
| 8,743,502 B1 | 6/2014 | Bonke et al. |
| 8,749,910 B1 | 6/2014 | Dang et al. |
| 8,751,699 B1 | 6/2014 | Tsai et al. |
| 8,755,141 B1 | 6/2014 | Dang |
| 8,755,143 B2 | 6/2014 | Wilson et al. |
| 8,756,361 B1 | 6/2014 | Carlson et al. |
| 8,756,382 B1 | 6/2014 | Carlson et al. |
| 8,769,593 B1 | 7/2014 | Schwartz et al. |
| 8,773,802 B1 | 7/2014 | Anderson et al. |
| 8,780,478 B1 | 7/2014 | Huynh et al. |
| 8,782,334 B1 | 7/2014 | Boyle et al. |
| 8,793,532 B1 | 7/2014 | Tsai et al. |
| 8,797,669 B1 | 8/2014 | Burton |
| 8,799,977 B1 | 8/2014 | Kapner, III et al. |
| 8,819,375 B1 | 8/2014 | Pruett et al. |
| 8,825,976 B1 | 9/2014 | Jones |
| 8,825,977 B1 | 9/2014 | Syu et al. |
| 2001/0040833 A1* | 11/2001 | Bogin et al. ............... 365/222 |
| 2004/0098498 A1* | 5/2004 | Mitra ........................ 709/231 |
| 2006/0010299 A1* | 1/2006 | Zhang et al. ............... 711/162 |
| 2006/0101197 A1* | 5/2006 | Georgis et al. ............. 711/111 |
| 2008/0005465 A1* | 1/2008 | Matthews .................. 711/113 |
| 2008/0120463 A1* | 5/2008 | Ashmore ................... 711/114 |
| 2009/0034377 A1* | 2/2009 | English et al. ........... 369/47.13 |
| 2009/0113702 A1 | 5/2009 | Hogg |
| 2010/0115229 A1* | 5/2010 | Thelen ...................... 711/207 |
| 2010/0125695 A1* | 5/2010 | Wu et al. ................... 711/103 |
| 2010/0306551 A1 | 12/2010 | Meyer et al. |
| 2011/0226729 A1 | 9/2011 | Hogg |
| 2012/0159042 A1 | 6/2012 | Lott et al. |
| 2012/0275050 A1 | 11/2012 | Wilson et al. |
| 2012/0281963 A1 | 11/2012 | Krapf et al. |
| 2012/0324980 A1 | 12/2012 | Nguyen et al. |
| 2014/0201424 A1 | 7/2014 | Chen et al. |

* cited by examiner

DISK DRIVE WITH RECENT WRITE STREAMS LIST FOR DATA REFRESH DETERMINATION

BACKGROUND

Disk drives comprise a disk and a head connected to a distal end of an actuator arm which is rotated about a pivot by a voice coil motor (VCM) to position the head radially over the disk. The disk comprises a plurality of radially spaced, concentric tracks for recording user data sectors and embedded servo sectors. The embedded servo sectors comprise head positioning information (e.g., a track address) which is read by the head and processed by a servo control system to control the velocity of the actuator arm as it seeks from track to track.

During a write operation, a current is applied to a write element of the head (e.g., a write coil) to create a magnetic field which magnetizes the surface of the disk by orienting the direction of magnetic grains (e.g., horizontally in longitudinal magnetic recording, or vertically in perpendicular magnetic recording). The orientation of the grains exhibits hysteresis thereby generating their own magnetic field when the write magnetic field is removed. During a read operation, a read element of the head (e.g., a magnetoresistive element) transduces the magnetic field emanating from the disk surface into a read signal that is demodulated into an estimated data sequence.

The hysteresis of the magnetic grains is not permanent meaning that over time the grains will orientate into random directions (magnetic entropy) until the magnetic field is no longer sensed reliably (leading to data errors during reproduction). Magnetic entropy may also be precipitated by various factors, such as increasing ambient temperature. That is, at higher temperatures the uniform alignment of the grains will degrade faster. Another factor that precipitates magnetic entropy is a phenomenon referred to as adjacent track interference (ATI) wherein when writing data to a target track, the fringe field from the write element degrades the uniform alignment of the grains recorded in an adjacent track. The fringe field from the write element may also adversely affect a wider range of tracks with respect to the written track, a phenomena referred to as wide area track erasure or WATER. The degrading effect of ATI on the adjacent tracks as well as WATER on the near adjacent tracks compounds over time with each write operation to the target track. Eventually, the magnetic field emanating from the disk surface will deteriorate to the point that the data is no longer recoverable.

To protect the integrity of data within a region of the disk against degradation over time, the data may be refreshed, wherein the data is read from the disk and rewritten back to the disk. The refresh operation may be performed in the background, for example, after a certain number of writes are made within the region of the disk and/or other regions of the disk located near the region of the disk. The disk drive may perform refresh operations for many regions of the disk in the background to protect the data integrity of the disk.

However, when the disk drive is busy handling host commands, the user may experience an undesirable slow down of the command execution time while the disk drive initiates and executes refresh operations in the background, thereby resulting in an undesirable decrease in drive performance. Thus, it is important to determine when a refresh operation for a particular region of the disk is necessary to avoid the undesirable performance penalty associated with performing a premature refresh operation.

DETAILED DESCRIPTION

Figures 1A, 1B:
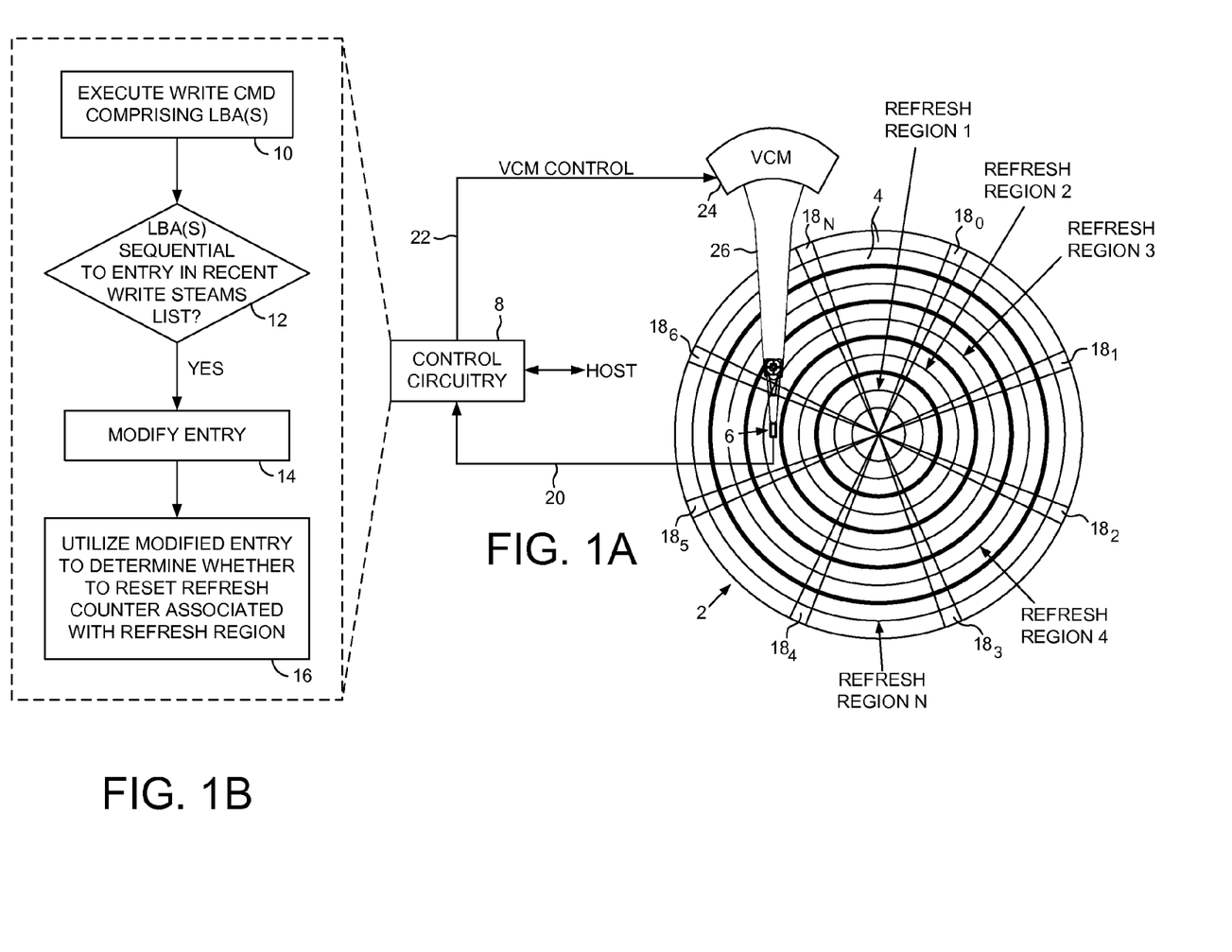
FIG. 1A shows a disk drive according to an embodiment of the present invention comprising a disk comprising a plurality of refresh regions, a head actuated over the disk surface, and control circuitry.
FIG. 1B is a flow diagram according to an embodiment of the present invention wherein a write command comprising LBA(s) is executed, an entry in a recent write streams list is modified if the LBA(s) in the write command are sequential to the entry, and the modified entry is utilized to determine whether to reset a refresh counter associated with a refresh region of the disk.

FIG. 1A shows a disk drive according to an embodiment of the present invention comprising a disk 2 having a plurality of data tracks 4, and a head 6 actuated radially over the disk 2 to write data to and read data from the disk 2. The disk 2 further comprises a plurality of refresh regions, wherein each refresh region comprises one or more of the data tracks 4, and wherein each data track 4 comprises a plurality of sectors. In one embodiment, each refresh region comprises a pie-shaped group of sectors extending from the inner diameter to the outer diameter of the disk 4. The disk drive further comprises control circuitry 8 operable to execute the flow diagram of FIG. 1B, wherein a write command comprising one or more logical block addresses (LBAs) is executed (step 10), and a determination is made as to whether the one or more LBAs are sequential to an entry in a recent write streams list (step 12). When the one or more LBAs are sequential to an entry in the recent write streams list, the entry is modified (step 14). The modified entry is utilized to determine whether to reset a refresh counter associated with one of the refresh regions on the disk (step 16).

In the embodiment of FIG. 1A, the disk 2 further comprises a plurality of embedded servo sectors $18_0$-$18_N$ which define the plurality of data tracks 4. Each servo sector 18, comprises head positioning information such as a track address for coarse positioning during seeks, and servo bursts for fine positioning while tracking the centerline of a target track during write/read operations. The control circuitry 8 processes a read signal 20 emanating from the head 6 to demodulate the servo sectors into a position error signal (PES). The PES is filtered with a suitable compensation filter to generate a control signal 22 applied to a VCM 24 which rotates an actuator arm 26 about a pivot in a direction that reduces the PES.

Refresh counters are used to determine whether to refresh data stored in the data tracks of the corresponding refresh region of the disk. In one embodiment, when a refresh counter exceeds a threshold, the corresponding refresh region is refreshed in a refresh operation performed by reading and rewriting the data stored in the refresh region. In an embodiment of the invention, when a refresh counter exceeds a lower threshold, the data in the corresponding refresh region is scanned to determine whether a rewrite is necessary, and when a refresh counter exceeds an upper threshold, the data in the corresponding refresh region is rewritten. When the refresh counter exceeds the lower threshold, for example, the data in the corresponding refresh region is rewritten only if a number of detected error correction codes (ECC) errors exceeds an ECC threshold.

The refresh operation may be executed in any suitable manner and at any suitable time. In one embodiment, a refresh operation is performed on a refresh region immediately after its refresh counter exceeds a threshold. In another embodiment, a refresh region is scheduled for refresh after its refresh counter exceeds a threshold, and the refresh operation executed during an idle mode of the disk drive (when the disk drive is not processing access commands received from the host). In one embodiment, the refresh counters are used to prioritize the refresh operations such that refresh regions having higher refresh counters are refreshed sooner relative to the other refresh regions.

Figure 1C:
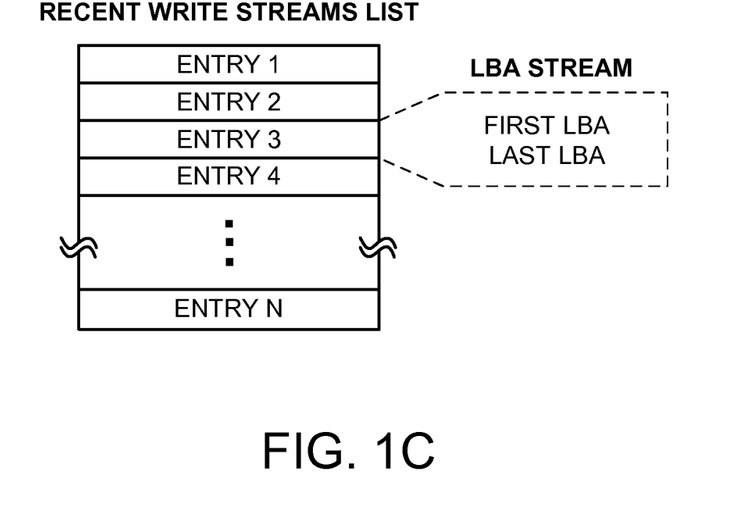
FIG. 1C shows a recent write streams list according to an embodiment of the present invention comprising a plurality of entries, wherein each entry comprises a first and a last LBA of an LBA stream.
Figure 1D:
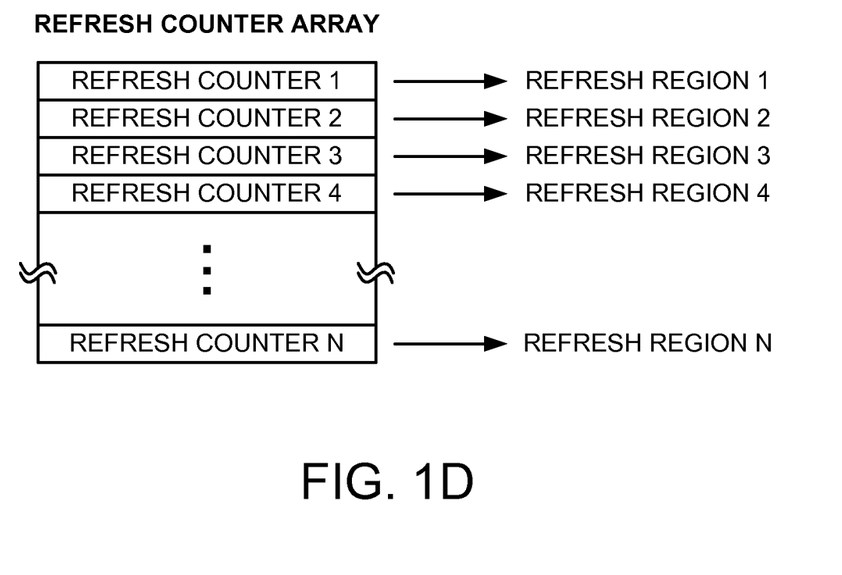
FIG. 1D shows a refresh counter array according to an embodiment of the present invention comprising a plurality of refresh counters, wherein each refresh counter is associated with a refresh region of the disk.

In the embodiment of the invention shown in FIG. 1C, a recent write streams list comprises a plurality of entries, wherein each entry comprises a first and a last LBA of an LBA stream comprising a sequential string of LBAs that have been written to one of the refresh regions of the disk 2. In the embodiment of FIG. 1C, the entries in the recent write streams list are ordered from oldest entry to latest entry, wherein the oldest entry (i.e., entry N) is situated in the oldest entry position in the list and the latest entry (i.e., entry 1) is situated in the latest entry position. In the embodiment of FIG. 1C, the oldest entry position is located at the bottom of the recent write streams list and the latest entry position is located at the top of the list.

In one embodiment, whenever the control circuitry 8 executes a write command received from the host, the control circuitry 8 updates the recent write streams list by either modifying an existing entry with the LBA(s) in the write command, or adding a new entry representing an LBA stream comprising the LBA(s) in the write command and removing the oldest entry. In an embodiment of the invention, the LBA(s) in the write command are sequential to an entry in the recent write streams list when the LBA(s) are sequential to the LBA stream represented by the entry. In an embodiment, when the LBA(s) in the write command are sequential to an entry, the control circuitry 8 modifies the entry by adding the LBA(s) in the write command to the write stream represented by the entry, wherein the modified entry represents a new write stream comprising the first LBA of the old write stream (the write stream represented by the entry prior to modification) and the last LBA in the write command.

In one embodiment, when the LBA(s) are not sequential to an entry, the control circuitry 8 removes the oldest entry in the recent write streams list, and adds a new entry representing the LBA(s) in the write command, wherein the new entry comprises a first and a last LBA of the write command. In an embodiment, whenever an entry in the recent write streams list is modified, the control circuitry 8 moves the modified entry to the latest entry position in the recent write streams list. In one embodiment, the recent write streams list is stored in volatile memory, such as dynamic random access memory (DRAM) or static random access memory (SDRAM). In an embodiment of the invention, the recent write streams list is stored in non-volatile memory, such as Flash memory or the disk 4.

In the embodiment of the invention shown in FIG. 1D, a refresh counter array comprises a plurality of refresh counters, wherein each refresh counter corresponds to one refresh region of the disk 2. In one embodiment, the control circuitry 8 resets a refresh counter when a new entry or a modified entry spans (i.e., entirely overlaps) the range of LBAs in a corresponding refresh region. A refresh counter may be reset, for example, by setting its count value to zero. In one embodiment, the refresh counter array is implemented by the control circuitry 8. In an embodiment of the invention, the control circuitry 8 increases a refresh counter whenever data is written in a portion of a corresponding refresh region. In one embodiment, the control circuitry 8 increases the count value of a refresh counter when the control circuitry 8 detects an event that contributes to data degradation in a corresponding refresh region.

Figure 2A:
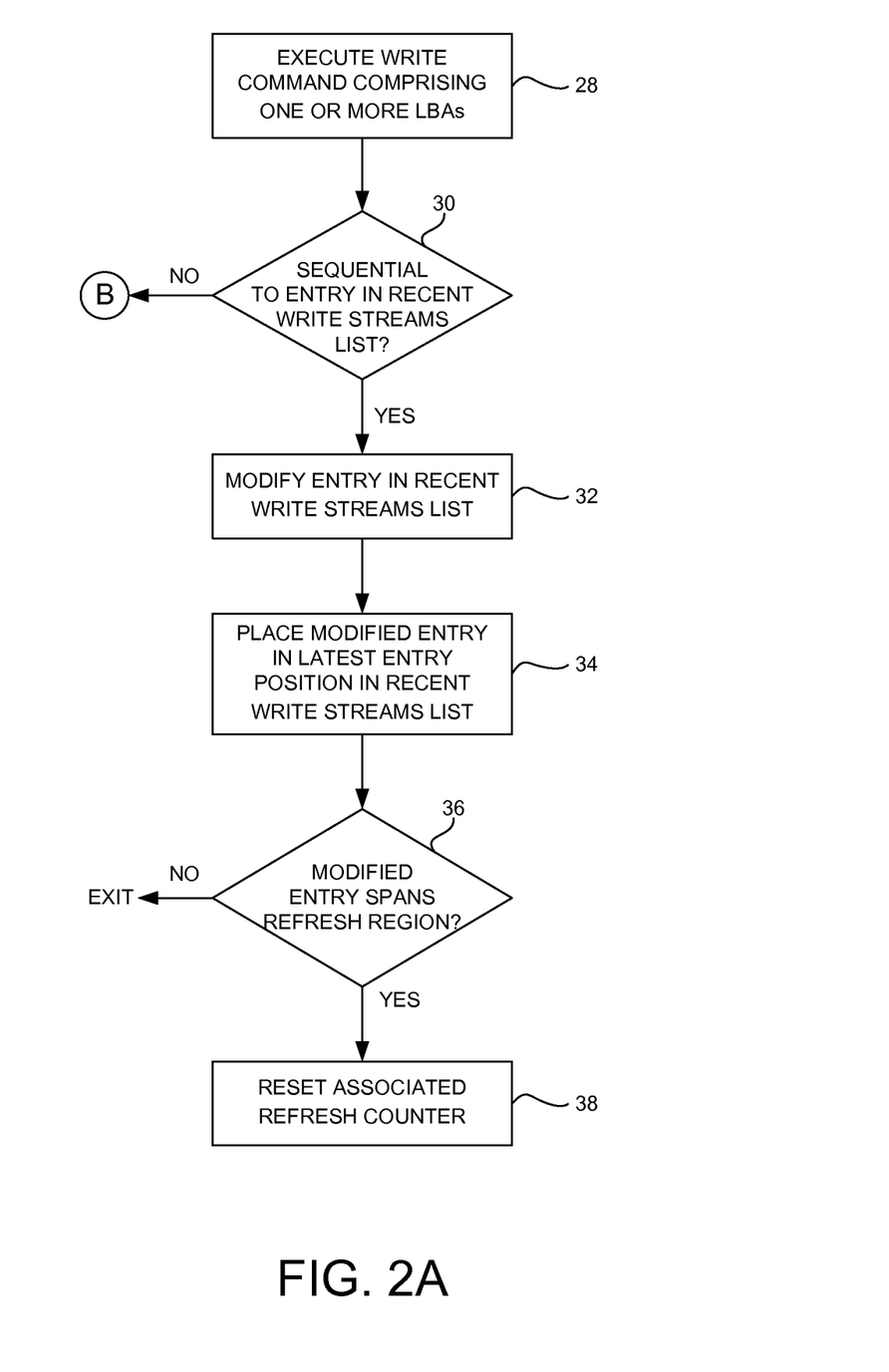
FIG. 2A is a flow diagram according to an embodiment of the present invention wherein, when LBA(s) in a write command are sequential to an entry in a recent write streams list, the entry is modified, and a refresh counter is reset when the modified entry spans an associated refresh region of the disk.

FIG. 2A is a flow diagram executed by the control circuitry 8 according to an embodiment of the present invention, wherein the control circuitry 8 executes a write command comprising one or more LBAs (step 28). The write command may be executed, for example, by writing data associated with the LBA(s) to one or more data tracks in a refresh region of the disk 2. The control circuitry 8 determines whether the one or more LBAs in the write command are sequential to an entry in the recent write streams list (step 30). In one embodiment, the control circuitry 8 determines whether the LBA(s) in the write command are sequential to an entry in the recent write streams list by determining whether the last LBA in one of the entries, when incremented by one, is equal to the first LBA in the write command.

In the embodiment shown in the flow diagram in FIG. 2A, the control circuitry 8 modifies an entry in the recent write streams list when the LBA(s) in the write command are sequential to the entry (step 32), and moves the modified entry to the latest entry position in the recent write streams list (step 34). In one embodiment, the LBA(s) in the write command are sequential to an entry in the recent write streams list when the entry, when incremented by one, is equal to the first LBA in the write command. In an embodiment of the invention, the control circuitry 8 modifies the entry by adding the LBA(s) in the write command to the LBA stream represented by the entry, wherein the modified entry comprises a first LBA of the entry prior to modification, and a last LBA in the write command. In one embodiment, the latest entry position is situated at the top of the recent write streams list and the oldest entry position is situated at the bottom of the recent write streams list.

In the embodiment in FIG. 2A, the control circuitry 8 determines whether the modified entry spans a refresh region of the disk 2 (step 36). In one embodiment, the modified entry spans a refresh region when the first and last LBAs in the modified entry encompass the range of LBAs in the refresh region. When the modified entry spans a refresh region, the control circuitry 8 resets an associated refresh counter (step 38). In one embodiment, the associated refresh counter is reset by setting its count value to zero.

Figure 2B:
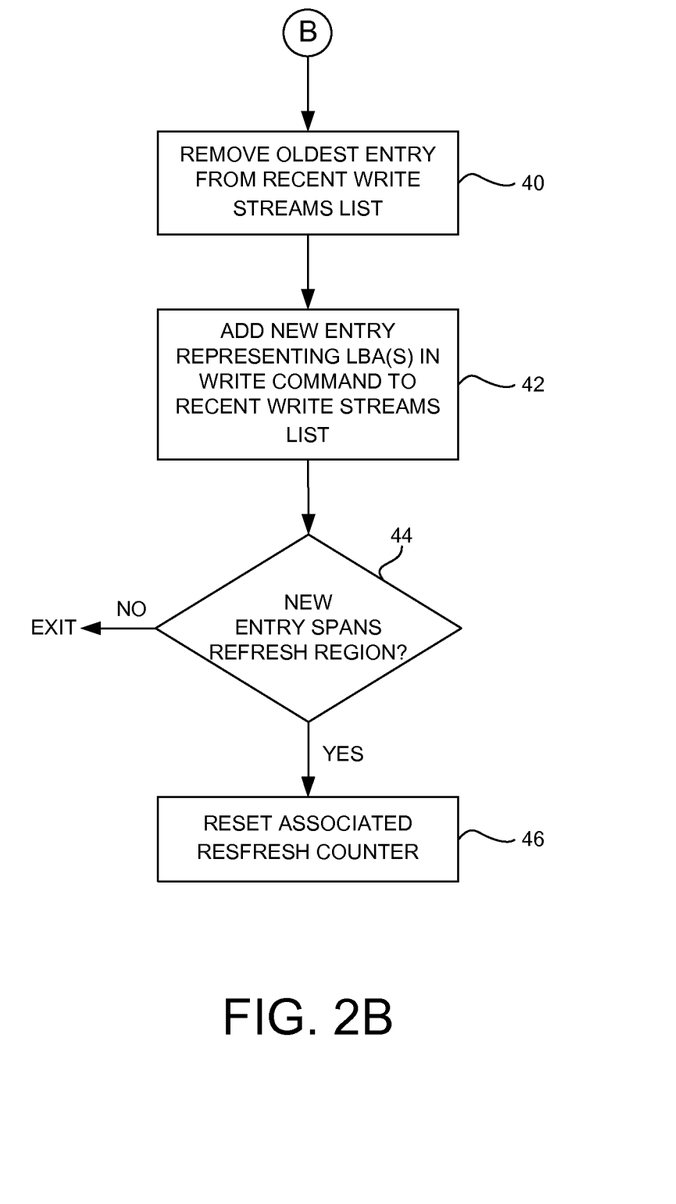
FIG. 2B is a flow diagram according to an embodiment of the present invention wherein, when LBA(s) in a write command are not sequential to an entry in a recent write streams list, a new entry associated with the LBA(s) is added to the recent write streams list, and a refresh counter is reset when the new entry spans an associated refresh region of the disk.

FIG. 2B is a flow diagram according to an embodiment of the present invention which extends the flow diagram of FIG. 2A. In the embodiment of FIG. 2B, when the LBA(s) in the write command are not sequential to an entry in the recent write streams list, the control circuitry 8 removes the oldest entry from the recent write streams list (step 40), and adds a new entry in the recent write streams list, wherein the new entry represents an LBA stream comprising the LBA(s) in the write command (step 42). In one embodiment, the new entry comprises the first and the last LBA in the write command. In an embodiment, when the write command comprises one LBA, the new entry comprises only the single LBA. In one embodiment, the control circuitry 8 places the new entry in the latest entry position in the recent writes streams list. In the embodiment of FIG. 2B, the control circuitry 8 then determines whether the new entry spans a refresh region of the disk 2 (step 44). When the new entry spans a refresh region, the control circuitry 8 resets an associated refresh counter (step 46).

It is noted that the steps in the flow diagrams in FIGS. 2A and 2B are shown in a particular order to illustrate respective embodiments of the invention. In other embodiments, the steps in the flow diagrams in FIGS. 2A and 2B may be performed in a different order.

Any suitable control circuitry 8 may be employed in the embodiments of the present invention, such as any suitable integrated circuit or circuits. For example, the control circuitry 8 may be implemented within a read channel integrated circuit, or in a component separate from the read channel, such as a disk controller, or certain steps described above may be performed by a read channel and others by a disk controller. In one embodiment, the read channel and disk controller are implemented as separate integrated circuits, and in an alternative embodiment they are fabricated into a single integrated circuit or system on a chip (SOC). In addition, the control circuitry may include a suitable preamp circuit implemented as a separate integrated circuit, integrated into the read channel or disk controller circuit, or integrated into an SOC.

In one embodiment, the control circuitry 8 comprises a microprocessor executing instructions, the instructions being operable to cause the microprocessor to perform the steps of the flow diagrams described herein. The instructions may be stored in any computer-readable medium. In one embodiment, they may be stored on a non-volatile semiconductor memory external to the microprocessor, or integrated with the microprocessor in a SOC. In another embodiment, the instructions are stored on the disk 16 and read into a volatile semiconductor memory when the disk drive is powered on. In yet another embodiment, the control circuitry 8 comprises suitable logic circuitry, such as state machine circuitry.

What is claimed is:

1. A disk drive comprising:
    a disk comprising a plurality of refresh regions, each refresh region comprising a range of logical block addresses (LBAs);
    a memory separate from the plurality of refresh regions on the disk, the memory storing a recent write streams list comprising one or more entries, each entry representing an LBA stream;
    a head actuated radially over the disk to write data to and read data from the disk; and
    control circuitry coupled to the head, the control circuitry operable to:
        execute a write command comprising one or more LBAs;
        determine whether the one or more LBAs in the write command are sequential to an entry in the recent write streams list;
        modify an entry in the recent write streams list when the one or more LBAs in the write command are sequential to the entry;
        determine whether the modified entry entirely overlaps a refresh region; and
        if it is determined that the modified entry entirely overlaps the refresh region, reset an associated refresh counter based on the determination that the modified entry entirely overlaps the refresh region.

2. The disk drive as recited in claim 1, wherein the control circuitry is further operable to modify the entry by adding the one or more LBAs in the write command to the LBA stream represented by the entry.

3. The disk drive as recited in claim 1, wherein the control circuitry is further operable to determine that the one or more LBAs in the write command are sequential to the entry in the recent write streams list when a last LBA in the entry, when incremented by one, is equal to a first of the one or more LBAs in the write command.

4. The disk drive as recited in claim 1, wherein the control circuitry is further operable to add a new entry representing the one or more LBAs in the write command to the recent write streams list when the one or more LBAs are not sequential to an entry in the recent write streams list.

5. The disk drive as recited in claim 4, wherein the control circuitry is further operable to:
    determine whether the new entry entirely overlaps a refresh region; and
    reset an associated refresh counter when the new entry entirely overlaps a refresh region.

6. The disk drive as recited in claim 4, wherein the control circuitry is further operable to remove the oldest entry in the recent write streams list.

7. The disk drive as recited in claim 1, wherein the control circuitry is further operable to move the modified entry to a latest entry position in the recent write streams list.

8. The disk drive as recited in claim 1, wherein each refresh region comprises one or more data tracks.

9. The disk drive as recited in claim 1, wherein the one or more entries in the recent write streams list are ordered from oldest entry to latest entry.

10. The disk drive as recited in claim 1, wherein each entry in the recent write streams list comprises a first and a last LBA of the LBA stream represented by the entry.

11. A method of operating a disk drive, the disk drive comprising a disk, the disk comprising a plurality of refresh regions, each refresh region comprising a range of logical block addresses (LBAs), a memory separate from the plurality of refresh regions on the disk, the memory storing a recent write streams list comprising one or more entries, each entry representing an LBA stream, and a head actuated radially over the disk to write data to and read data from the disk, the method comprising:
    executing a write command comprising one or more LBAs;
    determining whether the one or more LBAs in the write command are sequential to an entry in the recent write streams list;
    modifying an entry in the recent write streams list when the one or more LBAs in the write command are sequential to the entry;
    determining whether the modified entry entirely overlaps a refresh region; and
    if it is determined that the modified entry entirely overlaps the refresh region, resetting an associated refresh counter based on the determination that the modified entry entirely overlaps the refresh region.

12. The method as recited in claim 11, further comprising modifying the entry by adding the one or more LBAs in the write command to the write stream represented by the entry.

13. The method as recited in claim 11, wherein determining whether the one or more LBAs in the write command are sequential to an entry in the recent write streams list comprises incrementing a last LBA in the entry by one, and determining that the incremented LBA is equal to a first of the one or more LBAs in the write command.

14. The method as recited in claim 11, further comprising adding a new entry representing the one or more LBAs in the write command to the recent write streams list when the one or more LBAs are not sequential to an entry in the recent write streams list.

15. The method as recited in claim 14, further comprising:
   determining whether the new entry entirely overlaps a refresh region; and
   resetting an associated refresh counter when the new entry entirely overlaps a refresh region.

16. The method as recited in claim 14, further comprising removing the oldest entry in the recent write streams list.

17. The method as recited in claim 11, further comprising moving the modified entry to a latest entry position in the recent write streams list.

18. The method as recited in claim 11, wherein each refresh region comprises one or more data tracks.

19. The method as recited in claim 11, wherein the one or more entries in the recent write streams list are ordered from oldest entry to latest entry.

20. The method as recited in claim 11, wherein each entry in the recent write streams list comprises a first and a last LBA of the LBA stream represented by the entry.

\* \* \* \* \*